Feb. 21, 1967 J. G. HACKMAN ETAL 3,304,912
FISH CONFINER FOR USE IN AQUARIUMS
Filed Oct. 12, 1965
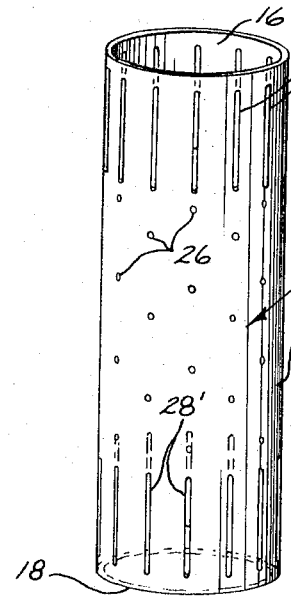
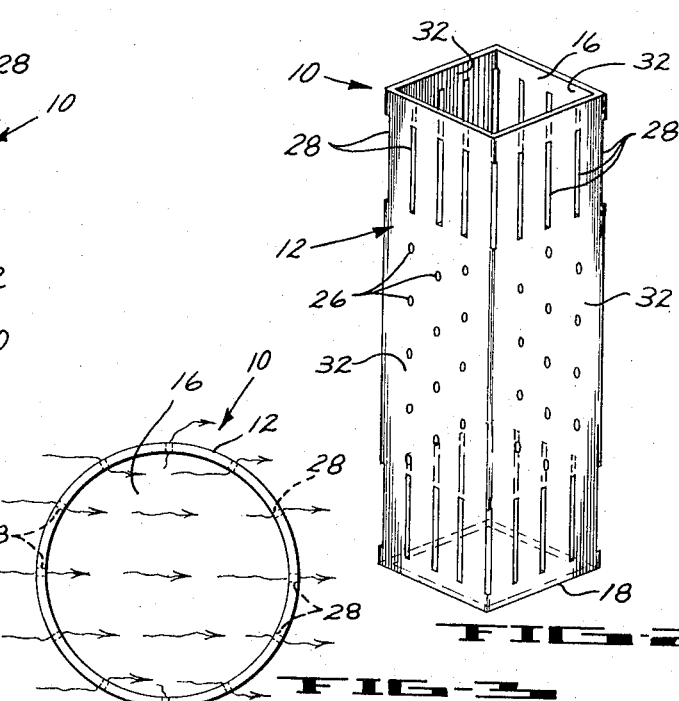
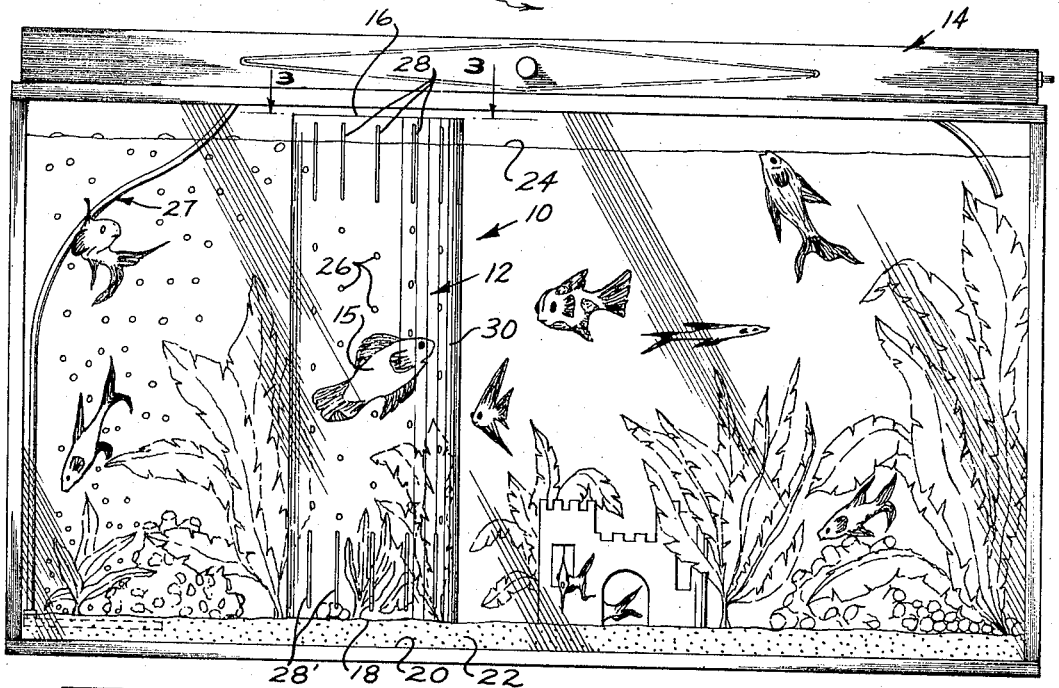
INVENTORS
LA VONA R. HACKMAN
JAMES G. HACKMAN
BY
ATTORNEYS ated Feb. 21, 1967

3,304,912
FISH CONFINER FOR USE IN AQUARIUMS
James G. Hackman and La Vona R. Hackman, both of 7816 Topia St., Long Beach, Calif. 90808
Filed Oct. 12, 1965, Ser. No. 495,152
2 Claims. (Cl. 119—5)

The present invention relates to aquariums and, more particularly, to a novel device for isolating particular fish within an aquarium.

The raising and breeding of tropical fish is becoming an increasingly popular hobby. In the hobby, the fish are confined in glass aquariums, generally including plant life and rocks to provide an attractive setting for the fish. It is also common practice to keep large numbers of different size, shape and color fish in the same aquarium to produce a colorful, ever-changing and interesting scene.

Unfortunately, the raising of different fish in the same aquarium can present some serious problems, particularly in the case of very small, sick and fighting fish. Very small fish, such as "neons" may be devoured by other fish in the tank, while sick fish generally require a quiet setting, free of the annoyances of other fish, in order to recover rapidly. For these reasons it is recommended to separate very small and sick fish from the other fish in the aquarium.

Fighting fish, such as "bettas," on the other hand, are very active, colorful fish and add greatly to the picturesque scene in an aquarium. Unfortunately, however, fighting fish possess very vicious tendencies and in fact are rather cannibalistic—attacking, feeding upon and even devouring other fish including their own breed. It is therefore absolutely necessary to separate the fighting fish from other tropical fish in an aquarium.

The separation of a very small, sick or fighting fish of course can be accomplished by keeping the particular fish in a separate aquarium. In the case of fighting fish, this detracts from the overall beauty of the scene in an aquarium and in all cases requires an expensive duplication of equipment as well as separate maintenance and feeding. For these reasons, the use of different aquariums is not a very satisfactory solution to the problems of fish isolation.

Alternatively, a partition may be used to divide the aquarium into different sections. In practice, however, it is very difficult to mount and seal a partition at the sides of an aquarium and the aquarium must be drained before mounting of the partition. Also, when in place, the partition materially detracts from the over-all beauty of the aquarium, being particularly unsightly at the sides of the aquarium, and blocks the flow of aerated water throughout the aquarium, requiring the use of separate aerators. For these reasons, partitions find little use in isolating very small, sick and fighting fish.

Apparently the most popular devices presently used for separating fish in an aquarium are breeding boxes formed by a plastic frame box covered with nylon netting, and secondly, a clear plastic box without perforations. Both of these devices are rather expensive, require separate attachment means to the sides of the aquarium, and are very unsightly. When in use, fish waste products are deposited on the net and on the bottom of the box while food becomes embedded in the corners of the box, thereby requiring the net and box devices to be repeatedly cleaned and serviced.

In view of the foregoing, it is an object of the present invention to provide an attractive means for isolating sick, very small, or fighting fish in an aquarium.

It is another object of the present invention to provide an attractive fish confiner which does not require separate mounting means to the sides of the aquarium and which does not block the flow of aerated water throughout the aquarium.

A further object of the present invention is to provide an attractive fish confiner for sick, very small, or fighting fish which is simple in design and inexpensive to manufacture.

Still another object of the present invention is to provide a fish confiner of the foregoing character which is easy to mount in an aquarium and requires little if any servicing and cleaning, which, if necessary, may be accomplished simply by washing with sponge and water.

The foregoing, as well as other objects and advantages of the present invention may be more clearly understood by reference to the following detailed description when taken with the drawing which, by way of example only, illustrates two forms of fish confiners embodying the features of the present invention.

In the drawing:

FIGURE 1 is a perspective view of one form of fish confiner;

FIGURE 2 is a perspective view of another form of fish confiner;

FIGURE 3 is a top view of the fish confiner illustrated in FIGURE 1 with arrows diagrammatically representing the flow of aerated water through the elongated apertures in the topmost portion of the fish confiner; and FIGURE 4 is a side view of an aquarium including the fish confiner of FIGURE 1 for separating a fish from the other fish in the aquarium.

In the drawing, the fish confiner is represented generally by the numeral 10 and comprises a tubular member 12 dimensioned to fit within an aquarium 14 and to isolate a fish 15 from the other fish in the aquarium. The tubular member 12 is preferably formed of a transparent, nontoxic material, such as a glass or plastic, and has an open top 16 and a completely open, flat bottom 18.

As illustrated in FIGURE 4, the fish confiner 10 is constructed such that when in use, the open bottom 18 rests flush with and firmly on the bottom 20 of the aquarium 14, which is generally covered with a sand 22, and the top 16 extends vertically a small distance above the water level 24 in the aquarium. Being transparent, the lines of the fish confiner 10 blend into rather than detract from the beauty of the setting within the aquarium. In fact, as illustrated in FIGURE 4, the fish confiner 10 is very decorative in the aquarium 14.

The height of the fish confiner 10 prevents fish from swimming or jumping from the main body of the aquarium into the tubular member 12 and the fish 15 from swimming or jumping out of the tubular member into the main body of the aquarium.

The open bottom 18 permits plant life to grow in sand 22 upwardly from the bottom of the aquarium within the fish confiner 10 making the confiner appear as an integral part of the aquarium. The open bottom 18 also allows uneaten food and waste products of the fish 15 to drop freely to the sand 22 without depositing on the fish confiner 10, thereby maintaining the tubular member 12 clean and reducing service requirements to an absolute minimum. In this regard, if it should be desired to clean the fish confiner 10, this may be accomplished simply by removing the tubular member 12 from the aquarium 14 and washing with sponge and water as one would ordinary glassware.

The general arrangement of the fish confiner 10 affords easy mounting within the aquarium 14 simply by inserting the tubular member 12 vertically into the water until the open bottom 18 rests upon the bottom 20 of the aquarium. Also, to maintain clean bottom sand 22 under the fish confiner 10, the tubular member 12 can be moved from one location to another simply by lifting the tubular member 12 slightly from the bottom 20, moving it over the sand and then reseating it on the bottom of the aquarium.

Preferably, the tubular member 12 includes a plurality of vertically and laterally spaced apertures 26 for permitting aerated water, formed in the aquarium by an aerator 27, to circulate through the fish confiner 10. This allows the fish confiner 10 to be used for fish which require aerated water, such as "platies" and "neons." In this regard, the apertures 26 are large enough to allow water to circulate freely therethrough, but small enough to prevent the fish 15 from escaping through the vertical wall or walls of the confiner.

In addition, the tubular member 12 preferably includes a plurality of laterally spaced apertures 28 adjacent the open top 16 and dimensioned to extend above and below the water line 24. Preferably, the apertures 28 are elongated, narrow, vertically extending openings, wide and long enough to allow for surface water circulation through the confiner 10 (see FIGURE 3), yet narrow enough to prevent fish from swimming therethough. The function of the apertures 28, in allowing surface water circulation, is very important in maintaining the fish confiner 10 clean, since without surface water circulation, dry food floating on the water tends to create an unsightly surface scum which adheres to the inside walls of the tubular member 12. A like plurality of apertures 28' are included in the tubular member 12 adjacent the open bottom 18 to allow either end of the tubular member to act as the bottom or top of the fish confiner 10.

As represented in FIGURES 1 and 4, the tubular member 12 is preferably of a cylindrical construction having a continuous vertical side wall 30. Alternatively, however, as shown in FIGURE 2, the tubular member 12 may be multi-sided with a plurality of vertical side walls 32 joined along their vertical edges and with elongated apertures 28 at the corners to insure complete surface water circulation and to prevent food build-up in the corners of the fish confiner.

In either form, the fish confiner 10 may be produced in different sizes and shapes for different size aquariums and may be inexpensively manufactured in large quantities using conventional mass-production glass or plastic-forming techniques. Therefore, the fish confiner 10 provides a very inexpensive, attractive and service-free means for isolating very small, sick or fighting fish in an aquarium.

While in the foregoing, particular forms of fish confiners have been described in some detail, changes and modifications may occur to those skilled in the art without departing from the spirit of the present invention. It is therefore intended that the present invention be limited in scope only by the terms of the following claims.

We claim:

1. A fish confiner for separating and confining particular tropical fish and the like in a larger aquarium, comprising:

a transparent, self-supporting, tubular member for mounting vertically in the aquarium without contacting the sidewalls thereof, said tubular member including a completely open bottom for resting firmly on the bottom of the aquarium, the transparency of said tubular member providing a clear view of the fish confined therein and rendering said member substantially invisible in said aquarium, said tubular member having a vertical height greater than the water level in said aquarium and including a plurality of apertures large enough to allow water to circulate from the aquarium through said tubular member around the fish confined therein and small enough to prevent the fish from swimming therethrough.

2. The fish confiner of claim 1, wherein at least some of said apertures are vertically long enough to extend above and below said water level in said aquarium to provide means allowing surface water in said aquarium to circulate through and from said tubular member thereby preventing the formation of a surface film or scum within said confiner.

References Cited by the Examiner

UNITED STATES PATENTS

| | | | |
|---|---|---|---|
| 1,838,215 | 12/1931 | De Clairmont | 119—5 |
| 2,207,514 | 7/1940 | Haldeman | 119—5 X |
| 2,696,800 | 12/1954 | Rork | 119—5 |
| 3,216,395 | 11/1965 | Girard | 119—5 |

SAMUEL KOREN, *Primary Examiner.*

H. R. CHAMBLEE, *Examiner.*